US00RE48500E

(19) United States
(12) Reissued Patent
Mercer et al.

(10) Patent Number: US RE48,500 E
(45) Date of Reissued Patent: Apr. 6, 2021

(54) ELECTRIC VEHICLE CHARGING DEVICE

(71) Applicant: Volta Charging, LLC, San Francisco, CA (US)

(72) Inventors: Scott A. Mercer, Pacifica, CA (US); Michael A. Menendez, Vashon, WA (US); Christopher R. Ching, Los Angeles, CA (US); Raul G. Podesta, La Plata (AR)

(73) Assignee: VOLTA CHARGING, LLC, San Francisco, CA (US)

(21) Appl. No.: 29/707,818

(22) Filed: Oct. 1, 2019

Related U.S. Patent Documents

Reissue of:
(64) Patent No.: Des. 844,559
Issued: Apr. 2, 2019
Appl. No.: 29/441,028
Filed: Dec. 31, 2012

(51) LOC (13) Cl. ..... 13-02
(52) U.S. Cl.
USPC ..... D13/107
(58) Field of Classification Search
USPC ..... D13/107–110, 118–119, 184; D14/251, D14/253, 432, 434
CPC ..... Y02E 60/12; Y02T 90/14; Y02T 90/122; Y02T 90/128; Y02T 90/163; H02J 7/025; H02J 7/0042; H02J 7/0044; H02J 7/0045; H02J 7/0003; H02J 7/0027; H02J 7/0013; H02J 7/0054; H02J 7/00; H02J 2001/008; H02J 3/32; H02J 3/008; H01F 38/14; H01R 13/6675; H01M 2/1022; H01M 2/1055; H01M 10/44; H01M 10/46; H01M 10/425; B60L 11/182; B60L 11/1809; B60L 11/1861; B60R 16/03
See application file for complete search history.

(56) References Cited

U.S. PATENT DOCUMENTS

D273,580 S * 4/1984 Riumbau ..... D13/107
D459,234 S 6/2002 Bourque et al.
6,459,234 B2 10/2002 Kajiura
D507,813 S * 7/2005 Gillard ..... D20/19
D542,849 S * 5/2007 Hill et al. ..... D20/10
D608,733 S 1/2010 Smith
D608,734 S 1/2010 Smith
D613,683 S 4/2010 Baxter et al.
D618,168 S 6/2010 Baxter et al.
D618,204 S 6/2010 Andre et al.
D626,063 S 10/2010 Cutter et al.
D626,064 S 10/2010 Cutter et al.
D626,065 S 10/2010 Cutter et al.
D633,908 S 3/2011 Akana et al.
D637,553 S 5/2011 Shin
D644,218 S 8/2011 Akana et al.
D646,269 S * 10/2011 Crick et al. ..... D14/307
D647,053 S 10/2011 Gotou et al.
D654,430 S 2/2012 Demers et al.
D654,857 S 2/2012 Salazar et al.
D654,858 S 2/2012 Salazar et al.
D654,860 S 2/2012 Holthusen
D654,861 S 2/2012 Holthusen
D659,635 S 5/2012 Hou et al.
D664,086 S 7/2012 Chin-Ho Kim et al.
D664,087 S 7/2012 Chin-Ho Kim et al.
D664,089 S 7/2012 Chin-Ho Kim et al.
D669,071 S 10/2012 Akana et al.
D674,334 S * 1/2013 Cutter et al. ..... D13/107
D691,208 S * 10/2013 Gorelick ..... D20/10
D696,658 S * 12/2013 Winston et al. ..... D14/307
D708,573 S * 7/2014 Gieniec et al. ..... D13/107
D712,349 S * 9/2014 Ahlgren ..... D13/107
D720,285 S * 12/2014 Gilomen ..... D13/107
D729,157 S * 5/2015 Gilomen ..... D13/107
D730,822 S * 6/2015 Chin-Ho Kim ..... D13/107
D733,647 S * 7/2015 Farrell ..... D13/107
D749,503 S * 2/2016 Ferguson ..... D13/107
9,325,182 B2 * 4/2016 Venkataraman ..... H02J 7/0042
D771,562 S * 11/2016 Dolle ..... D13/107
D777,101 S * 1/2017 Shimada ..... D13/107
D778,818 S * 2/2017 Bruining ..... D13/107
9,705,346 B2 * 7/2017 Bonwit ..... B60L 53/305
D816,077 S * 4/2018 Benic ..... D14/307
D833,387 S * 11/2018 Baxter ..... D13/107

(Amended)

| | | | | | |
|---|---|---|---|---|---|
| D838,668 | S | * | 1/2019 | Westfall | D13/107 |
| D842,242 | S | * | 3/2019 | Zhang | D13/107 |
| D844,559 | S | | 4/2019 | Mercer et al. | |
| D858,435 | S | * | 9/2019 | Helnerus | D13/107 |
| D868,687 | S | * | 12/2019 | da Silva | D13/107 |
| D872,687 | S | * | 1/2020 | Mortun | D13/107 |
| D876,342 | S | * | 2/2020 | Mercer | D13/107 |
| D876,345 | S | * | 2/2020 | Mercer | D13/107 |
| D876,346 | S | * | 2/2020 | Mercer | D13/107 |
| D883,199 | S | * | 5/2020 | Santander | D13/107 |
| D884,613 | S | * | 5/2020 | Minkyo | D13/107 |
| 2010/0296234 | A1 | * | 11/2010 | Crick, Jr. | 361/679.21 |
| 2011/0145141 | A1 | * | 6/2011 | Blain | 320/109 |
| 2012/0262112 | A1 | | 10/2012 | Ross | |
| 2013/0069588 | A1 | * | 3/2013 | Oda et al. | 320/109 |
| 2013/0207606 | A1 | * | 8/2013 | Ranga et al. | B60L 53/31 320/109 |

OTHER PUBLICATIONS

Parsons, Sarah."France Announces $2.2 Billion Electric Car Charging Network." [retrieved on Dec. 28, 2012]. Retrieved from the Internet: <www.google. com/imgres?q=electric+vehicle-Fcharging+stations&num=10&um=1&h1=en&tbo=d&biw=1440&bih=783&tbm=isch&tbnid=QfP2cslOfm0K2MAimgrefurl=http://inhabitat.com/massachusetts-set-to-install-100-ev-charging-stations/&docid=NKQtedu9SWSKBM&imgurl=http://assets.inhabitat.com/wp-content/uploads/>.

Smartlet Coulomb Charging Station [retrieved Nov. 7, 2012]. Retrieved from the Internet: <www.google.com/imgres?q=electnc+vehicle+charging+stations&num=10&um=1&h1=en&tbo=d&biw=1440&bih=783&tbm=isch&tbnid=RKicGBKiRP2P7M:&imgrefurl=http://news.cnet.com/8301-11128_3-10167445-54.html&docid=CWP1h-N1014k3M&imgurl=http://news.cnet.com/i/pto/20090219/smartlet_Coulomb_charging_station-cityhall_270x407.

Bloomfield, Nikki Gordon. "Need An Electric Car Charging Station At Work? Here's One For Free." [retrieved Nov. 7, 2012]. Retrieved from the Internet <www.google.com/imgres?q-electric+vehicle-Fcharging+stations&start=22&num=10&um=l&h1=en&tbo=d&biw=1440&bih=783&tbm=isch&tbnid=njkABlvYoMe0IM:&imgrefurl=http://www.greencarreports.com/news/1079118_need-an-electric-car-charging-station-at-work-heres-one-for-free&docid=7ywn-IMbSk0AgM&imgurl=http://images.thecarconnection.com/smUchargepoint_100182292_s. n>.

"Smart Grids, Fast Charging—Infrastructure for Electric Car." [retrieved on Nov. 7, 2012]. Retrieved from the Internet: <www.google.com/imgres? q=electric+vehicle+charging+stations&start=20&num=10&um=l&h1=en&tbo=d&biw=1440&bih=783&tbm=isch&tbnid=f4piNYxrLOy80M:&imgrefurl=http://www.impactlab.net/2008/07/28/smart-grids-fast-charging-infrastructure-for-electric-cars/&docid=3pBfeFHp7Jg9mM&imgurl=http://www.impactlab.com/wp-content/uploads/2008/07/charging-station-london>.

"EV News: first-hotel to install electric car charging station for guests." [retrieved on Nov. 7, 2012]. Retrieved-from the Internet: <www.google.com/ imgres?q=electric+vehicle+charging +stations&start=307&num=10&um=l&h1=en&tbo=d&biw=1440&bih=783&tbm=isch&tbnid=78FIBWHajq0_ydM:&imgrefurl=http://www.examiner.com/article/ev-news-first-hotel-to-install-electric-car-charging-station-for-guests&docid=Hv6RWgv08bpOOM&imgurl=http://www.examiner.com/images/blog/wysiwyg/image/>.

"EV Charging Station, Volta—Honolulu, Hawaii." [retrieved on Dec. 30, 2012]. Retrieved from the Internet: <www.google.com/imgres?q=electric+vehicle -Fcharging+stations&start=307&num=10&um=l&h1=en&tbo=d&biw=1440&bih=783&tbm=isch&tbnid=78HBWHajq0_ydM:&imgrefurl=http://www.examiner.com/article/ev-news-first-hotel-to-install-electric-car-charging-station-for-guests&docid=Hv6RWgv06bpOOM&imgurl=http://www.examiner.com/images/blog/wysiwyg/image/>.

Buffalo Niagara Medical Campus. "Electric Vehicle Charging Stations Installed Across Campus." [retrieved on Dec. 30, 2012]. Retrieved from the Internet <www.google.com/imgres?q=electric +vehicle-Fcharging+stations&start=554&um=1&h1=en&tbo=d&biw=1440&bih=783&tbm=isch&tbnid=5QoChyg4wMwOeM:&imgrefurl=http://www.bnmc.org/electric-vehicle-charging-stations-installed-across-campus/&docid=V1NctdKztXxtKM&imgurl=http://www.bnmc.org/wp-content/uploads/charging-stations>.

"Electric-Vehicle Charging Stations Available at ACC Campuses." [retrieved Dec. 30, 2012]. Retrieved from the Intenet: <www.google.com/imgres?q=electnc +vehicle+charging +stafions&start=738&um=1&hl=en&tbo=d&biw=1440&bih=783&tbm=isch&tbnid=BCVZxvxp_xJfmM:&imgrefurl=http:Mnsideacc.ausfincc.edu/index.php/2012/01/13/electric-vehicle-charging-stations-available-at-acc-campuses/&docid=WIRnei31J_vhM&imgurl=http://insideacc.austincc.edu/wp-content/uploads/HBC-Charging-Station>.

University of Maryland: The Department of Transportation Services. "About Electric Vehicle Charging." [retrieved on Nov. 7, 2012]. Retrieved from the Internet: <http://www.google.com/imgres?q=electric+vehicle+charging+kiosk&um=1&h1=en&tbo=d&biw=813&bih=453&tbm=isch&tbnid=s6QZc2vv4M1g-MAimgrefurl=http://www.transportation.umd.edu/chargingstation.html&docid=DuYNDCLIkGewXM&imgurl=http://www.transportation.umd.edu/images/charging-station.

Moon, Jade. "Getting An EV Charge for Free." [retrieved on Dec. 30, 2012]. Retrieved from the Internet: <www.google.com/imgres?q-electric-Fvehicle+charging+kiosk&um=1&h1=en&tbo=d&biw=813&bih=453&tbm=isch&tbnid=spbpBxbTvGDwIMAimgrefurl=http://www.midweek.com/getting-an-ev-charge-for-free/&docid=Wh1DDU hKhM7U1M&imgurl=http://www.midweek.com/wp-content/uploads/2012/04/moon.

Electric Vehicle Kiosk. [retrieved on Nov. 7, 2012]. Retrieved from the Internet: <www.google.com/imgres?q=electric+vehicle+charging+kiosk&um=l&h1=en&tbo=d&biw=813&bih=453&tbm=isch&tbnid=19Qs24hR5V2XAM:&imgrefurl=http://article.wn.com/view/2012/04/04/0pConnect_Leads_the_Way_With_Social_MediaEnabled_Electric_Ve/&docid=GswMh lig P_2aVM&imgurl=http:M.ytimg.com/vi/Sd F4WoQqkYY/0.

* cited by examiner

*Primary Examiner* — Darlington Ly
(74) *Attorney, Agent, or Firm* — Morgan, Lewis & Bockius LLP

(57) CLAIM

The ornamental design for an electric vehicle charging [system] *device*, as shown and described.

DESCRIPTION

FIG. 1 is [an upper left front] *a top, front, and left side* perspective view of an electric vehicle charging [system showing] *device embodying* our new design;
FIG. 2 is [an upper right rear] *a top, rear, and right side* perspective view thereof;
FIG. 3 is a front elevational view thereof;
FIG. 4 is a right side elevational view thereof;
FIG. 5 is a rear elevational view thereof;
FIG. 6 is a left side elevational view thereof;
FIG. 7 is a top plan view thereof;
FIG. 8 is a bottom plan view thereof;
FIG. 9 is [a top left from] *an enlarged and partial top, front, and left side* perspective [cutaway] view *thereof* showing illumination elements;
FIG. 10 is [a side and enlarged elevational cutaway] *an enlarged and partial side elevational* view [of the electric vehicle charging system of FIGS. 4 and 6] *thereof;* and,
FIG. 11 is an enlarged bottom plan view *thereof* showing details of *the* air vents[of the electric vehicle charging system of FIG. 8].
[The shade lines in the Figures show contour and not surface ornamentation.]

The broken lines in the Figures show portions of the electric vehicle charging [system] *device* which forms no part of the claimed design.

1 Claim, 5 Drawing Sheets

Figure 11:
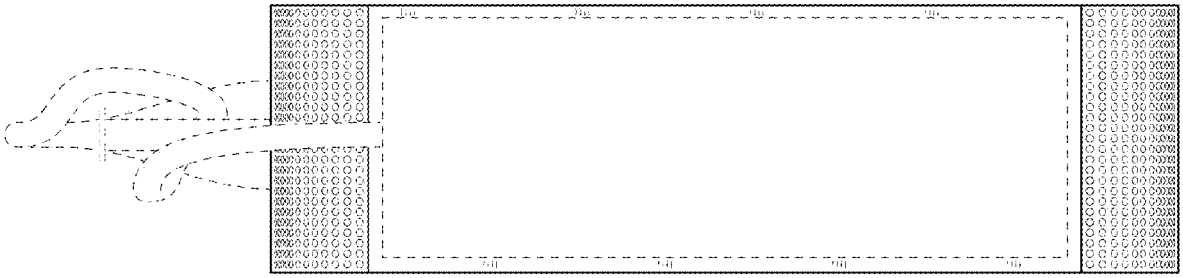

Matter enclosed in heavy brackets [ ] appears in the original patent but forms no part of this reissue; matter printed in italics indicates the additions made by reissue.

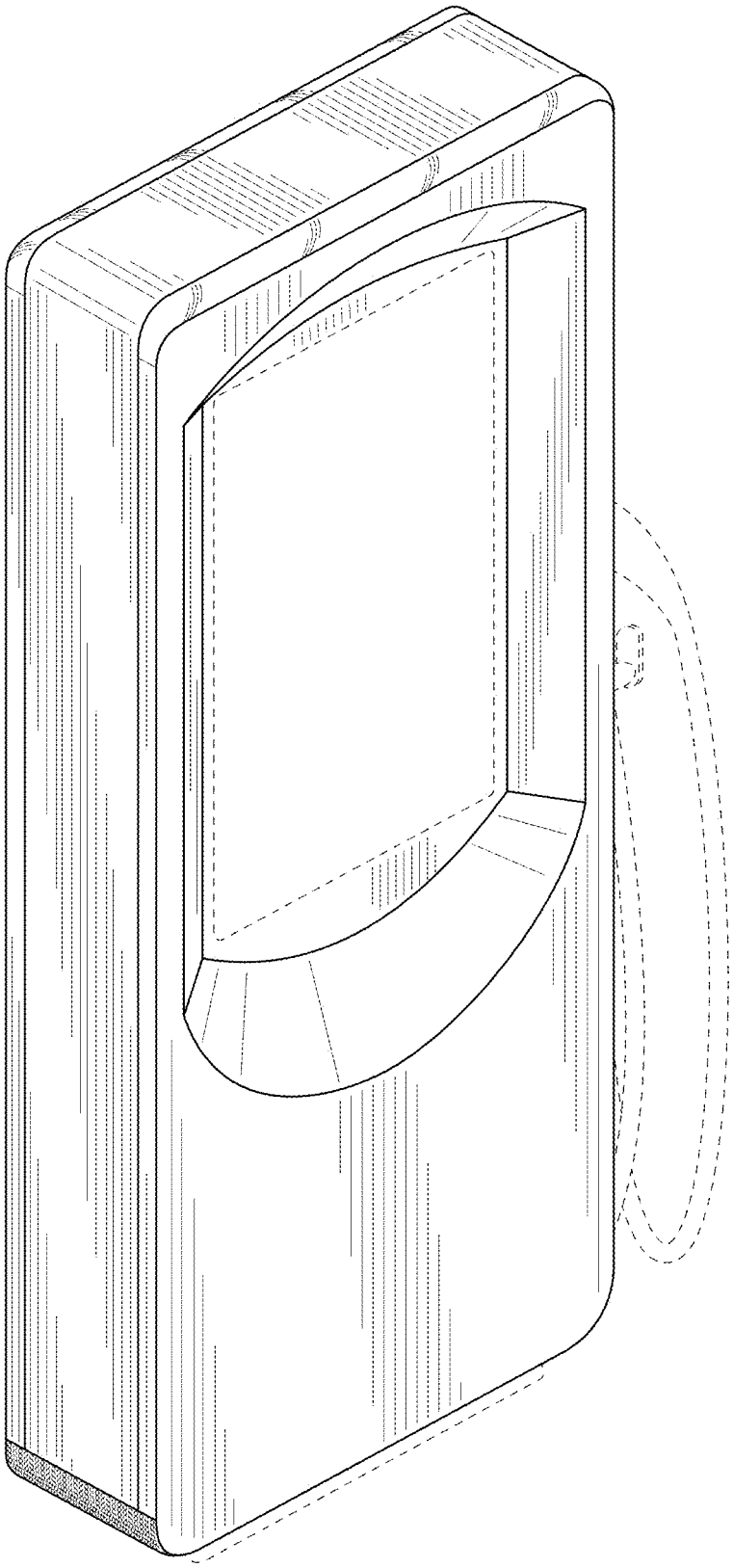
FIG. 1 (Amended)

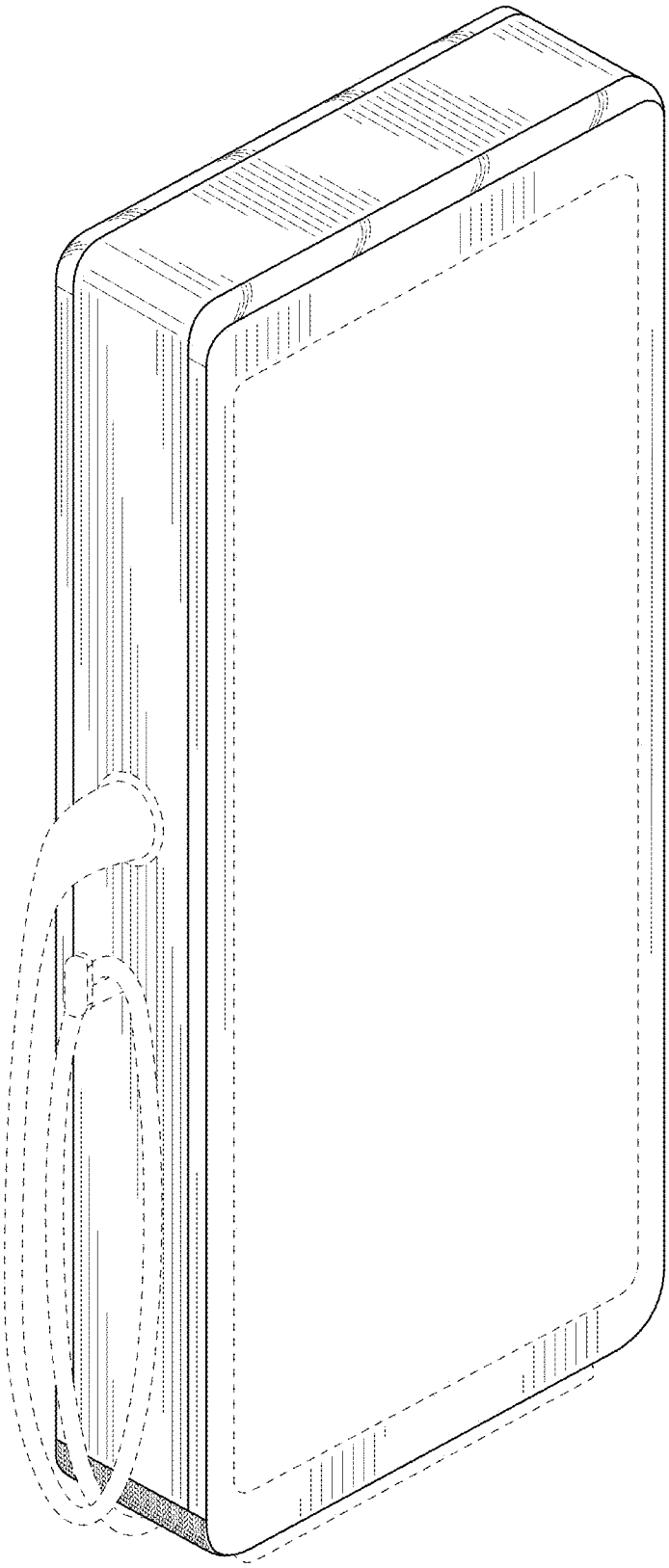
FIG. 2 (Amended)

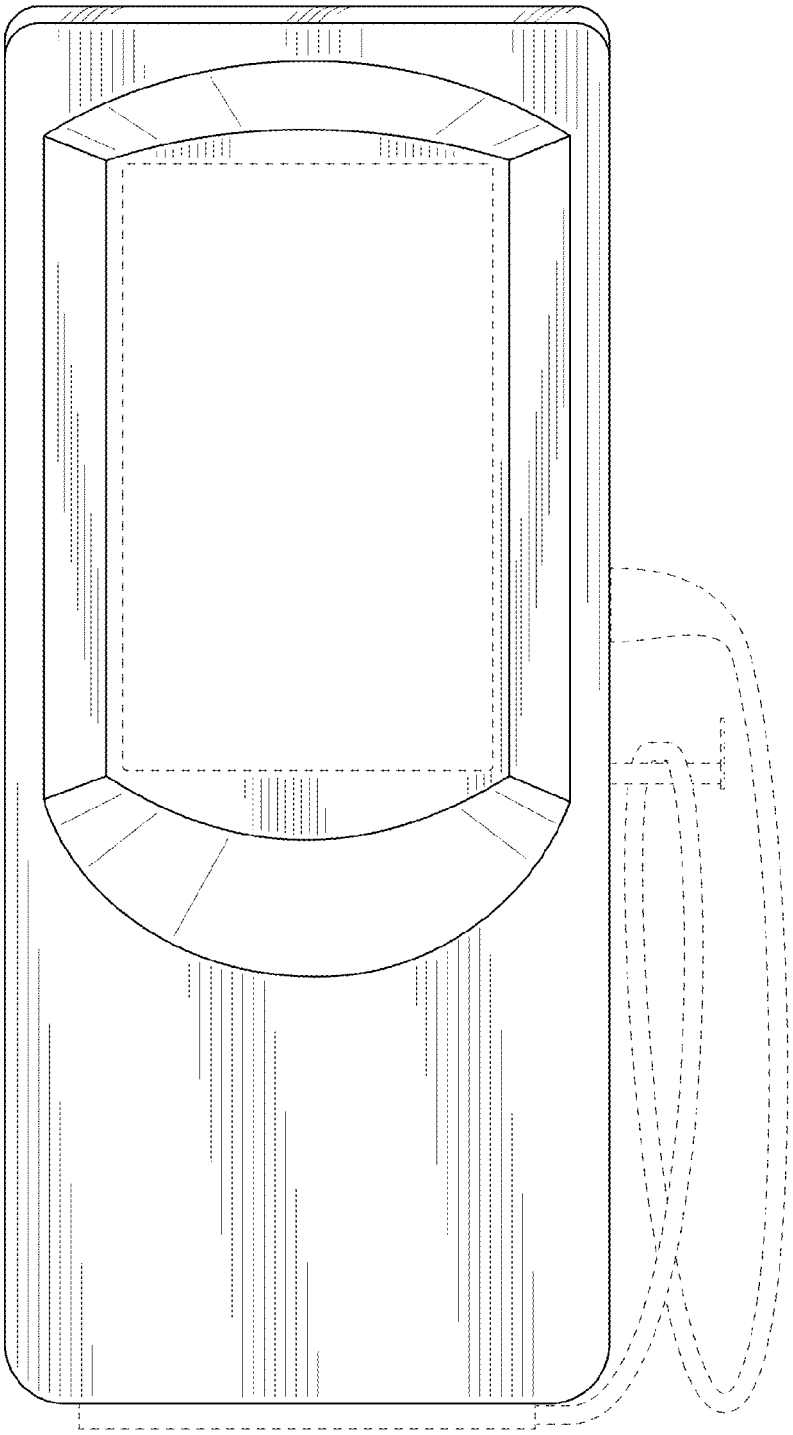
FIG. 3 (Amended)
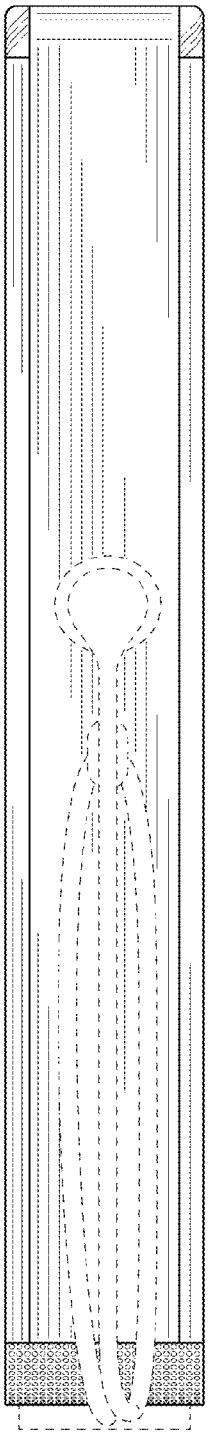
FIG. 4 (Amended)
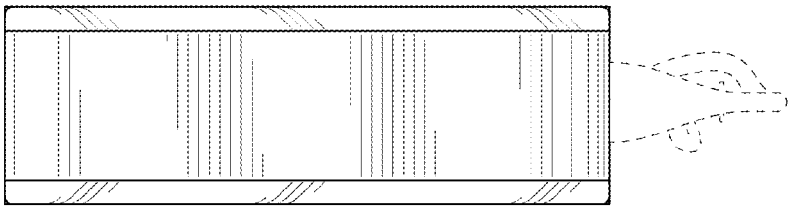
FIG. 7 (Amended)

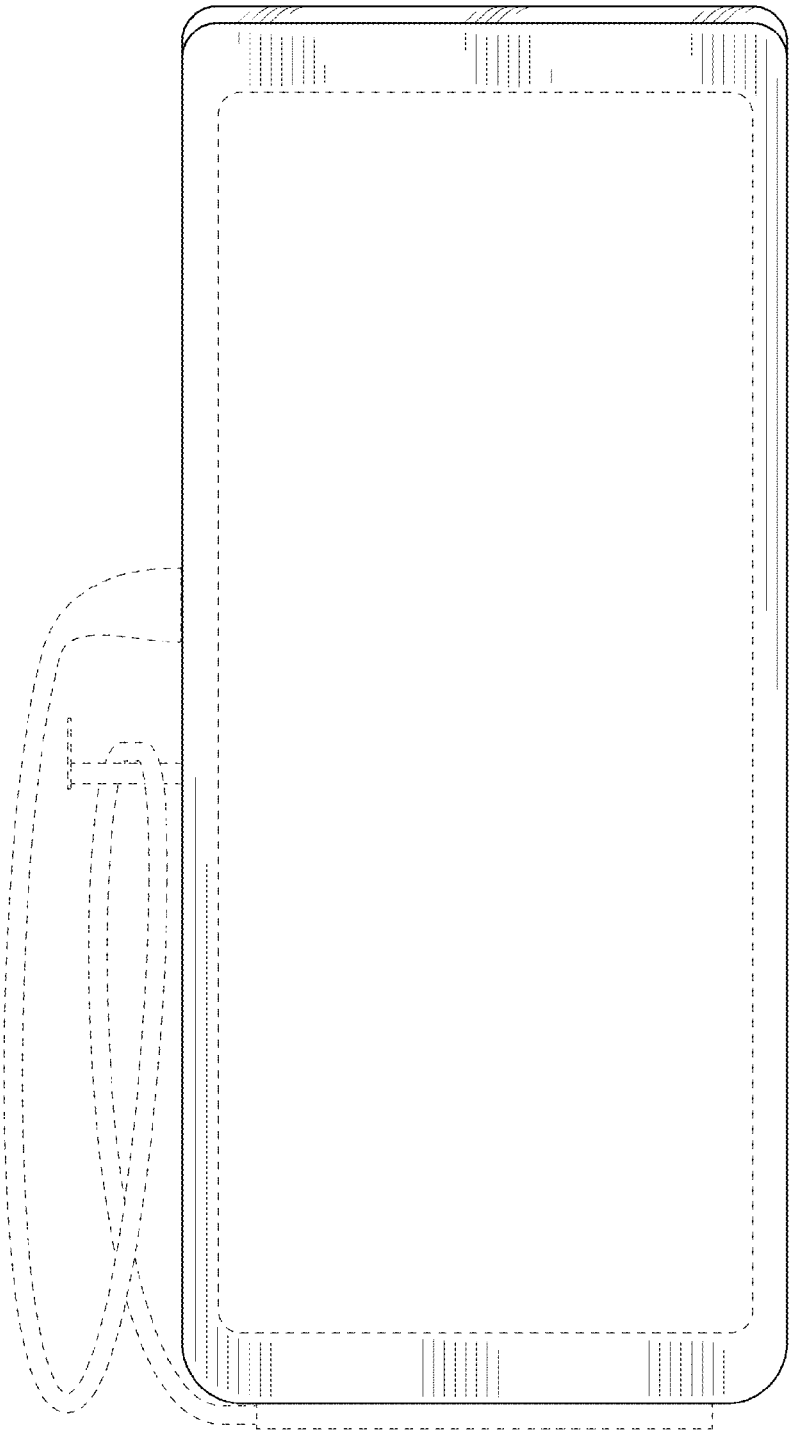
FIG. 5 (Amended)
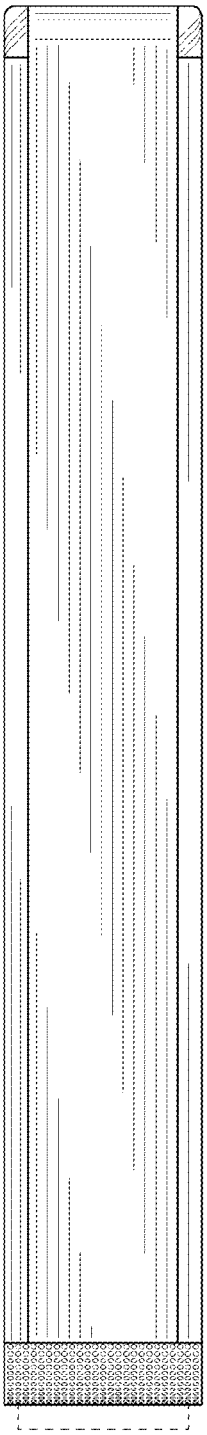
FIG. 6 (Amended)
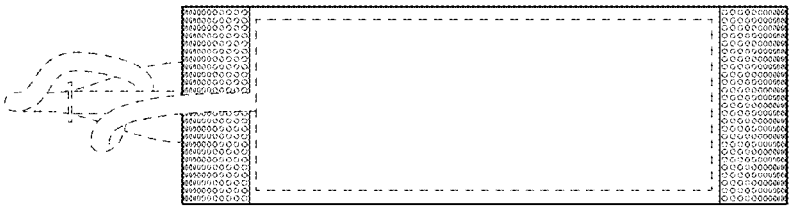
FIG. 8 (Amended)

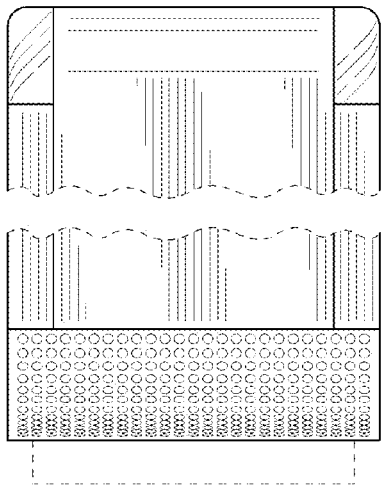

FIG. 9 (Amended)
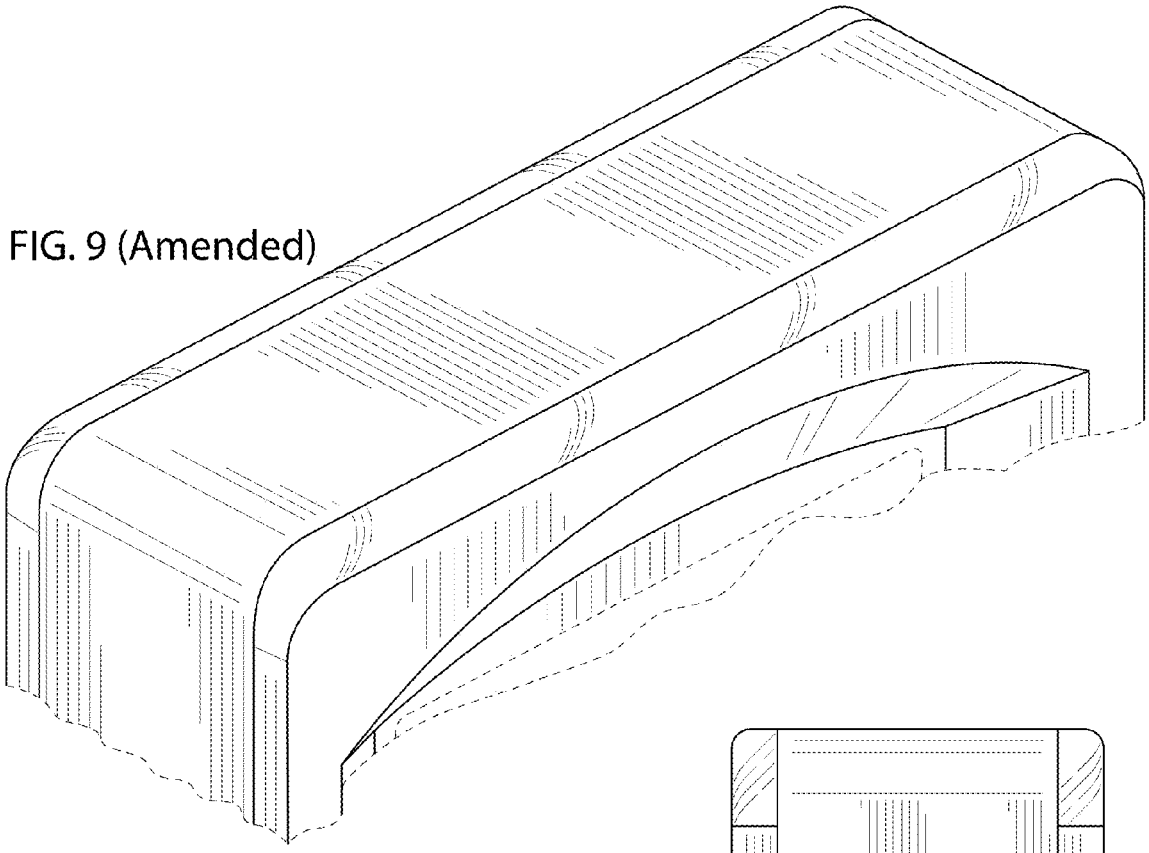
FIG. 10 (Amended)